UNITED STATES PATENT OFFICE.

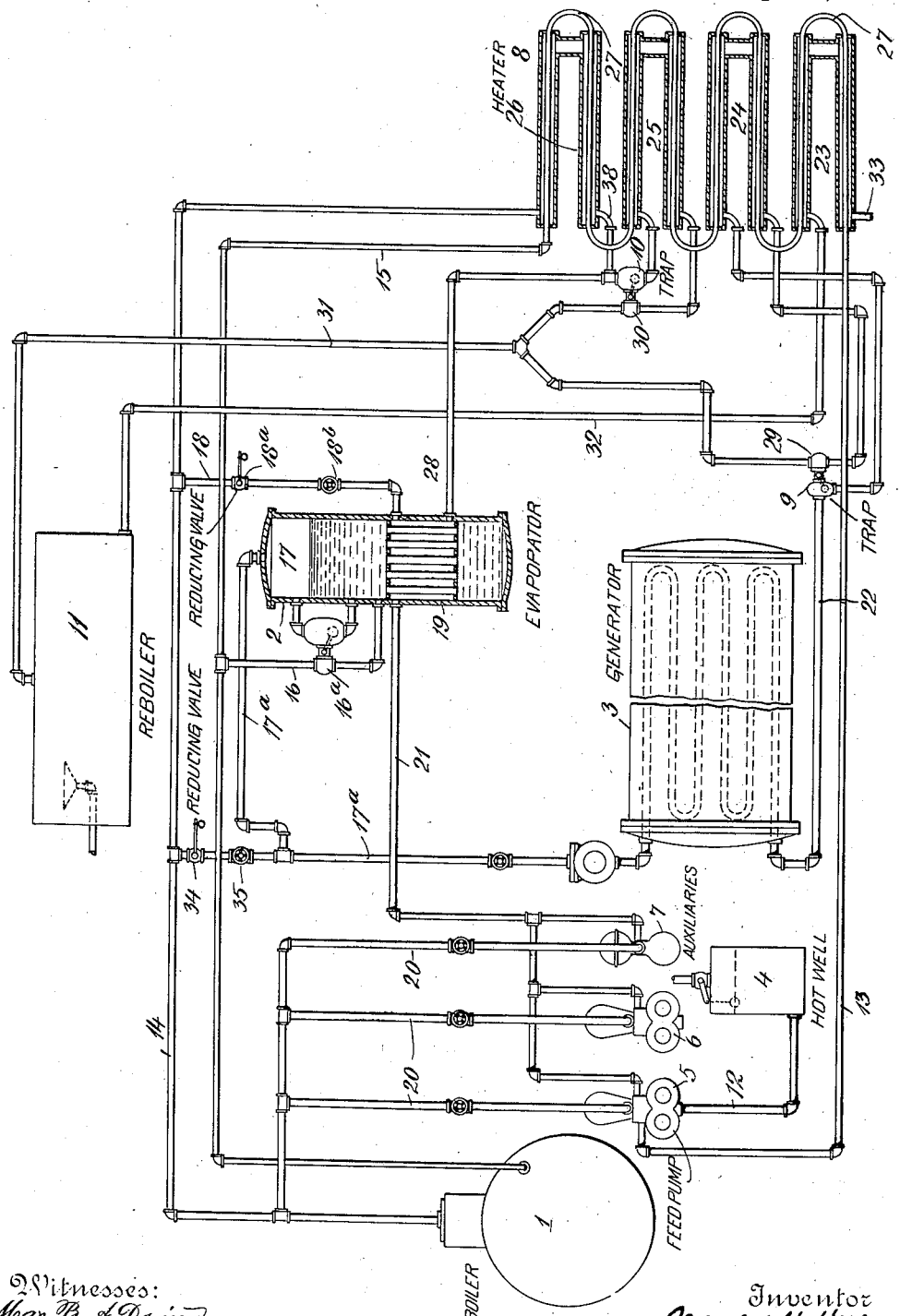

NICOLAI H. HILLER, OF CARBONDALE, PENNSYLVANIA.

EVAPORATING APPARATUS.

1,024,576.   Specification of Letters Patent.   Patented Apr. 30, 1912.

Application filed February 5, 1912. Serial No. 675,642.

*To all whom it may concern:*

Be it known that I, NICOLAI H. HILLER, a citizen of the United States of America, and a resident of Carbondale, county of Lackawanna, State of Pennsylvania, have invented certain new and useful Improvements in Evaporating Apparatus, of which the following is a specification.

My invention relates to evaporating apparatus, and is particularly intended for the production of pure distilled water such as is desired for the making of artificial ice, but is also applicable to the production of drinking water on ship-board and elsewhere, where purification of water by distillation is desired, also for the distillation of other liquids.

My invention embodies improvements over the invention of my Patent No. 955,965, dated April 26, 1910, and, like the invention of said patent, is particularly applicable for use in connection with absorption refrigeration apparatus and comprises a combination of distillation apparatus, an engine or engines, and absorption refrigeration apparatus, wherein live steam derived from a boiler or other suitable source of supply is supplied direct to such engine or engines, the exhaust from such engine or engines being delivered to an evaporator and there serving to make steam, which steam is supplied to the generator or still of the absorption refrigeration apparatus, the condensate from the evaporator and condensate from the heating coils of such generator, being collected as the pure water to be produced by the apparatus. Preferably a feed water heater is combined with the other apparatus mentioned, the said condensates being passed through the feed water heater and serving to heat the feed water for the boiler. Suitable means hereinafter described are provided for supplementing, from the main steam line, the supply of steam to the evaporator, to the generator, and for supplementing the heat supplied to the feed water heater.

The improved apparatus herein described has the advantage over the apparatus of said Patent No. 955,965, that drier steam is supplied to the engine or engines; also, the steam so supplied may conveniently be at higher pressure than is convenient in the apparatus of my said prior patent.

The object of my invention is to supply dry steam, and, preferably, steam of relatively high pressure, to the engine or engines of the apparatus, while maintaining high heat economy; and to make the apparatus as simple and inexpensive as possible.

In the accompanying drawing I illustrate diagrammatically apparatus embodying my invention.

In said drawing 1 designates a boiler or other suitable source of steam, which steam, for the purposes of this specification, may be termed high pressure steam; 2 designates an evaporator; 3 the generator of an absorption refrigeration apparatus; 4 a hot well, from which the water to be purified is taken; 5 a feed pump, which feed pump is to be considered, for the purposes of this specification, one of the engines above referred to; and 6 and 7, other engines, which are usually the auxiliaries commonly employed in absorption refrigeration apparatus but may be any other engines convenient to be operated as a part of the system; 8 a feed water heater; 9 and 10 traps through which water is supplied to the reboiler; and 11, a reboiler.

14 designates the main steam line for delivering high pressure steam to various parts of the apparatus as hereinafter described, and 20, 20 designate branches leading from this main steam line to the steam chests of the engines 5, 6 and 7.

21 designates an exhaust line receiving the exhaust from the three engines, 5, 6 and 7, and delivering the same to the heating chamber 19 of evaporator 2.

18 designates a branch from the main steam line 14 for supplementing the steam supplied to the heating chamber 19 of the evaporator, a suitable reducing valve 18ª being provided in this connection 18, also a suitable shutoff valve 18ᵇ.

17 designates the evaporating chamber of evaporator 2 and 17ª a pipe for conveying steam therefrom to the generator 3. Steam line 14 is connected to this pipe 17ª through a suitable reducing valve 34 and shutoff valve 35.

22 designates a pipe for conveying the condensate formed in the heating coils of generator 3 to trap 9.

28 designates a suitable pipe for conveying the condensate formed in evaporating chamber 19 of evaporator 2, to the trap 10.

In the operation of the apparatus as thus far described, the various engines of the apparatus, such, for example, as engines 5, 6 and 7, are operated on live steam supplied direct from boiler 1 through pipes 14 and 20, the exhaust from these engines being delivered through pipe 21 to heating chamber 19 of evaporator 2, such exhaust steam there serving to evaporate water in chamber 17 of evaporator 2, the steam so generated passing through pipe 17ª to the heating coils of generator 3 of the absorption refrigeration apparatus, and there serving to supply the heat necessary for the operation of such generator; the steam so supplied to generator 3 being condensed therein and being thence delivered, as water of condensation, to trap 9 while the steam condensed in chamber 19 of the evaporator is delivered, as water of condensation, to trap 10. The water of condensation so supplied to said traps, is delivered to the reboiler 11, preferably in the manner and by the means hereinafter described.

It will be seen that by this arrangement of apparatus, the various engines 5, 6 and 7 are operated by live or high pressure steam, which will, ordinarily, be relatively dry steam, and also will ordinarily be steam of higher pressure than the steam supplied to the corresponding engines of my prior above mentioned patent. The exhaust steam from these engines is utilized for the operation of the evaporator 2, and the steam formed in said evaporator is utilized for the operation of generator 3. Since it may at times happen that the exhaust steam supplied by the engines 5, 6 and 7 to the evaporator is not sufficient for operating such evaporator at the desired capacity, the connection 18 from the main steam line to the evaporator is provided; the reducing valve 18ª, in that connection, serving to reduce the steam so supplied from line 14 to the pressure desired to be maintained in the heating chamber 19 of the evaporator. Since the steam supplied by the evaporator to the generator 3 may at times be insufficient for the operation of such generator at its desired rate, the reducing valve 34 is provided to supply steam at such times direct from the steam line 14 to the line 17ª and so to the generator 3, said reducing valve 34 serving to reduce the pressure of the steam so drawn from the main steam line, to the pressure desired to be maintained in generator 3. By this apparatus so described, therefore, I accomplish the main purpose of my invention, namely, the operation of the engines 5, 6 and 7 on dry steam of relatively high pressure, and the operation of the generator 3 upon steam of suitable pressure, together with the production of an adequate amount of distilled water obtained both from the heating coils of the generator and from the heating chamber of the evaporator.

Preferably, I combine with the apparatus, above described, a feed water heater, wherein the heat contained in the condensates from chamber 19 of the evaporator and from the heating coils of the generator is utilized in the heating of the boiler feed water. In the apparatus described, engine 5 is supposed to be the boiler feed pump, which pump draws feed water from a hot well 4 or other suitable source of supply, through a pipe 12, and delivers said water, through a pipe 13, into the colder or entrance portion of the sectional feed water heater 8. Steam is supplied from the main steam line 14 into the hot or exit end of the feed water heater 8, the water to be heated and steam or water to do the heating flowing through separate conduits of this heater, in opposite directions, the steam so supplied to the feed water heater being finally condensed therein. The water heated in this feed water heater passes through a pipe 15 to the boiler 1, and through a pipe 16, branching from this pipe 15, to the evaporating chamber 17 of the evaporator 2. A suitable float-valve 16ª regulates the supply of said water to evaporating chamber 17. The water of condensation formed in chamber 19 of the evaporator, and supplied, as previously described, by pipe 28 to trap 10, is delivered by said trap into an intermediate section 25 of the evaporator, and the water of condensation supplied, as previously described, from the heating coils of generator 3 through pipe 22 to trap 9, is supplied by said trap into an intermediate section 24 of the feed water heater. The water condensed in section 26 of the feed water heater passes through a pipe 38, into the trap 10 and so into heater section 25. Valves 29 and 30 controlled by floats in traps 9 and 10 respectively, control the passage of water from heater sections 24 and 25, through a pipe 31 into reboiler 11; and the gas-freed water from this reboiler passes through pipe 32 into the lowest section 23, of the feed water heater, and thence out through a pipe 33. From this it will be seen that the feed water, in passing through the pipe 27, of the feed water heater, is heated progressively, by exchange of heat from fluids of progressively higher temperature. It will be heated, first, in section 23, by water from the reboiler, having a temperature of say 210° Fahrenheit (i. e., a temperature somewhat less than the boiling point of water at atmospheric pressure); it will be heated next, in section 24, by water from the generator 3, having a temperature of say 250° Fahrenheit; it will be heated next in section 25, by water from the evaporator 2, having a temperature of say 280° Fahrenheit; and it will be heated, finally, in section 26, by steam from line 14, having a temperature of say 350° Fahrenheit.

What I claim is:—

1. Evaporating and condensing apparatus comprising a primary vapor generator adapted to evaporate under high pressure, one or more power-generating means connected to said vapor generator to be operated by the vapor therefrom, a secondary evaporator connected to said power generating means to be operated by the vapor exhausted therefrom, said secondary evaporator arranged to evaporate at a lower pressure by exchange of heat with and condensation of the exhaust of said power generating means, a generator of an absorption refrigeration apparatus arranged to be operated by, and to condense, the vapor produced by said secondary evaporator, and means for collecting the condensates of said secondary evaporator and said generator of the absorption refrigeration apparatus.

2. Evaporating and condensing apparatus comprising a primary vapor generator adapted to evaporate under high pressure, one or more power-generating means connected to said vapor generator to be operated by the vapor therefrom, a secondary evaporator connected to said power generating means to be operated by the vapor exhausted therefrom, said secondary evaporator arranged to evaporate at a lower pressure by exchange of heat with and condensation of the exhaust of said power generating means, a generator of an absorption refrigeration apparatus arranged to be operated by, and to condense, the vapor produced by said secondary evaporator, a reboiler, and means for conveying thereto the condensates from said secondary evaporator and said generator of the absorption refrigeration apparatus.

3. Evaporating and condensing apparatus comprising a primary vapor generator adapted to evaporate under high pressure, one or more power-generating means connected to said vapor generator to be operated by the vapor therefrom, a secondary evaporator connected to said power generating means to be operated by the vapor exhausted therefrom, said secondary evaporator arranged to evaporate at a lower pressure by exchange of heat with and condensation of the exhaust of said power generating means, a generator of an absorption refrigeration apparatus arranged to be operated by, and to condense, the vapor produced by said secondary evaporator, a heater for the feed supply of said primary vapor generator arranged to exchange heat between such feed supply and the condensates of said secondary evaporator and refrigerating apparatus generator, under different pressures, a reboiler, and means for conveying the cooled condensates from said heaters to said reboiler.

4. Evaporating and condensing apparatus comprising a primary vapor generator adapted to evaporate under high pressure, one or more power-generating means connected to said vapor generator to be operated by the vapor therefrom, a secondary evaporator connected to said power generating means to be operated by the vapor exhausted therefrom, said secondary evaporator arranged to evaporate at a lower pressure by exchange of heat with and condensation of the exhaust of said power generating means, a direct connection, including pressure reducing means, between said primary vapor generator and said secondary evaporator, a generator of an absorption refrigeration apparatus arranged to be operated by, and to condense, the vapor produced by said secondary evaporator, and means for collecting the condensates of said secondary evaporator and said generator of the absorption refrigeration apparatus.

5. Evaporating and condensing apparatus comprising a primary vapor generator adapted to evaporate under high pressure, one or more power-generating means connected to said vapor generator to be operated by the vapor therefrom, a secondary evaporator connected to said power generating means to be operated by the vapor exhausted therefrom, said secondary evaporator arranged to evaporate at a lower pressure by exchange of heat with and condensation of the exhaust of said power generating means, a generator of an absorption refrigeration apparatus, arranged to be operated by, and to condense, the vapor produced by said secondary evaporator, a direct connection, including pressure reducing means, between said primary vapor generator and the generator of said refrigeration apparatus, and means for collecting the condensates of said secondary evaporator and said generator of the absorption refrigeration apparatus.

6. Evaporating and condensing apparatus comprising a source of supply of high pressure steam, one or more engines connected thereto, an evaporator having heating means connected to said engine or engines to receive the exhaust therefrom, said evaporator adapted to produce steam by exchange of heat with said exhaust, and to condense such exhaust, means for condensing the steam produced by said evaporator, and means for collecting the condensates of said evaporator and condensing means.

7. Evaporating and condensing apparatus comprising a source of supply of high pressure steam, one or more engines connected thereto, an evaporator having heating means connected to said engine or engines to receive the exhaust therefrom, said evaporator adapted to produce steam by exchange of heat with said exhaust, and to condense the steam produced by said evaporator, means for collecting the condensates of said evaporator and condensing means, and a direct connection from said source of high pressure steam to the heating means of said
5 evaporator, such direct connection including a reducing valve.

In testimony whereof I have signed this specification in the presence of two subscribing witnesses.

NICOLAI H. HILLER.

Witnesses:
H. M. MARBLE,
D. A. DAVIES.